H. TAYLOR.
Angle Protractor.
No. 45,535.
Patented Dec. 20, 1864.
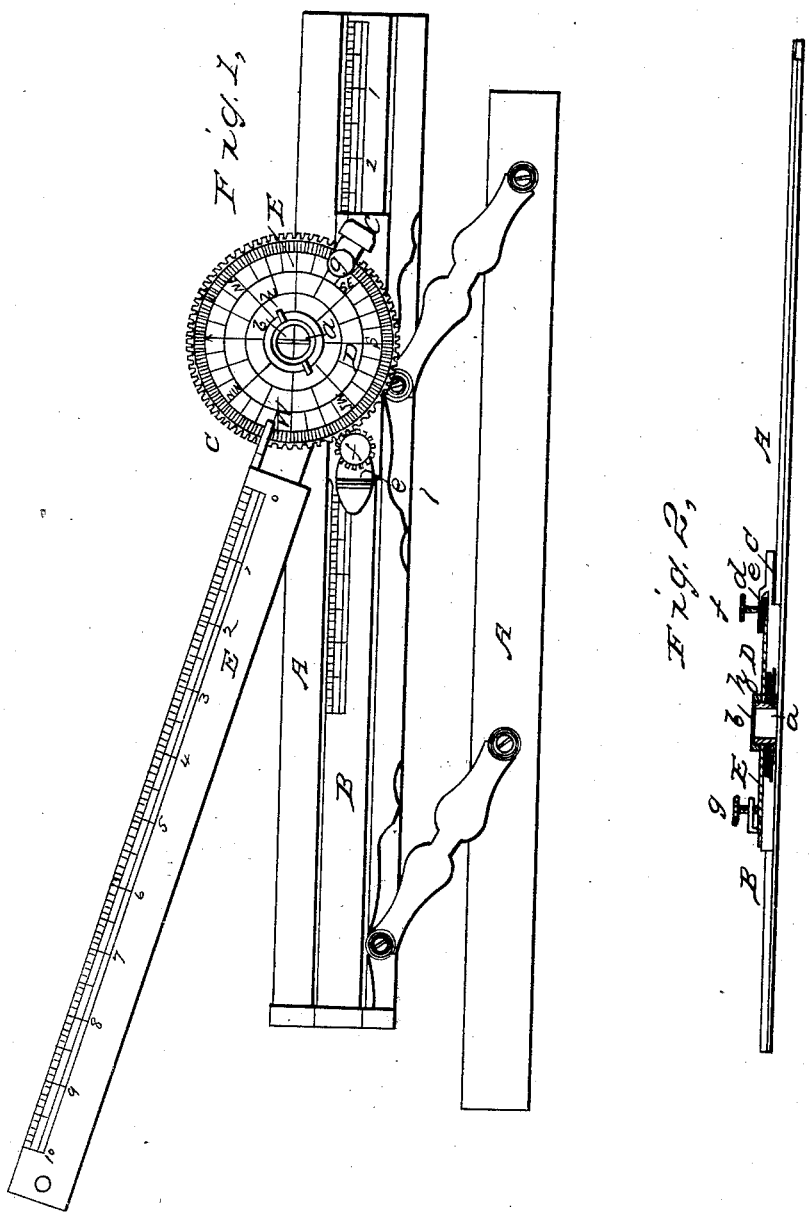

UNITED STATES PATENT OFFICE.

HENRY TAYLOR, OF THE UNITED STATES NAVY, NOW OF FORTRESS MONROE, VIRGINIA.

IMPROVEMENT IN ANGLE-PROTRACTORS.

Specification forming part of Letters Patent No. 45,535, dated December 20, 1864.

*To all whom it may concern:*

Be it known that I, HENRY TAYLOR, of the United States Navy, at present stationed at Fortress Monroe, Virginia, have invented a new and Improved Angle-Protractor; and I do hereby declare that the following is a full, clear, and exact description thereof, which will enable others skilled in the art to make and use the same, reference being had to the accompanying drawings, forming part of this specification, in which—

Figure 1 represents a plan or top view of this invention; Fig. 2, a longitudinal vertical section of the same.

Similar letters of reference indicate like parts.

This invention is particularly intended to facilitate the operations of laying off courses on board ships, and of locating a ship's position on a chart from cross-bearings, and also the operation of plotting a day's work, rendering it necessary to keep a traverse table of corrected courses, and the operation of ascertaining bearings between points. It may also be used with advantage in drafting, surveying, and other operations of a similar nature.

The invention consists in the application of a longitudinally-sliding revolving circle indicated as a compass or marked with a scale of degrees, and moving on a graduated scale, in combination with a radius-arm provided with a suitable scale and made to swing on the center of the compass-circle, and with ordinary parallel rulers, in such a manner that an instrument is obtained which combines the advantages of an ordinary parallel ruler, of a protractor, and of an ordinary rule, and which is of the greatest advantage on board of a vessel, as well as on shore, in all drafting or plotting operations.

The instrument at present used for the purpose of laying off courses on board ship, or for the purpose of locating a ship's position on a chart from cross-bearings, or for the purpose of determining the bearings of surrounding objects, consists of parallel rulers. The use of these rulers requires a tedious operation, and, furthermore, the results obtained by the same are subjected to serious and embarrassing errors.

In laying off courses on board ship with said parallel rulers the operator is obliged to traverse the chart from the position of the ship to the compass of reference, (an operation commonly known by the name of "fleeting" to and from a compass of reference,) which is laid out on the chart according to the true meridian, and then he has to calculate the magnetic course. In the meantime, perhaps the table is uneven or some rubbish has got under the chart, and during the operation the ruler may have slipped, and the result thus obtained will be altogether erroneous; and in locating a ship's position from cross-bearings, or in determining the bearings of surrounding objects, it is necessary to traverse the chart with the parallel rulers once for every bearing under all the inconveniences above pointed out, and for each bearing a separate calculation has to be made, should magnetic bearings be required, all of which render the operation tedious and liable to produce erroneous results. All these difficulties are obviated by the instrument which forms the object of this invention, and which consists of a pair of ordinary parallel rulers, A, one part of which is grooved and provided with a double flanged guideway, B, to receive and hold the slide C, to which the disk or circle D is attached. This circle turns easy on the hollow tube $a$, which forms a part of the slide C, and is provided with the cross-bar $b$ to indicate the center of the disk by the point at which is bisects the edge of the ruler.

The edge of the circle is provided with cogs $c$, which gear in a small pinion, $d$, that is mounted on a vertical arbor, which has its bearings in the slide and in a bracket, $e$, attached to the same. A button, $f$, secured to the end of this arbor, serves to turn the same and to adjust the circle D in any desired position, and when it has been adjusted it is fastened in its position by the clamp-screws $g$, which bear on the same near its circumference. The guideway B is marked with a scale of inches, so that the distance over which the slide C has been moved can be ascertained at a glance.

E is a radius-arm, which is hinged to the hollow center of the circle D, so that it turns on the same, and can be locked in any desired position by the set-nut $h$. The radius-arm is marked with a suitable scale of inches, and by its use lines can be drawn radiating from the center of the circle in any desired angle, and the distance of any point on said line can be ascertained at a glance by referring to the scale on the radius-bar.

This instrument will be found very useful in plotting surveys, and also in all mechanical and architectural drawing, but its particular advantages are as follows: first, the facility with which courses may be laid off on board ship, which in the old way is attended with much trouble and liability to accumulate an error in the process of what is called "fleeting" to or from a compass of reference, particularly if the chart is old and full of creases or the table on which the chart is spread is not freed from all rubbish; second, the expeditious manner in which a ship's position can be located on a chart from cross-bearings; third, its convenience in plotting a day's work rendering it necessary to keep a traverse table of corrected courses; fourth, the facility with which bearings between points can be determined; fifth, the fact of its doing away with the liability of applying the magnetic variation wrongly, which, however careless it may appear, is often done.

I claim as new and desire to secure by Letters Patent—

The radius-arm E, provided with a suitable scale, and operating in combination with the revolving compass-circle D, which is adjustable on the graduated scale B, and with the parallel rulers A, substantially in the manner and for the purpose herein shown and described.

H. TAYLOR.

Witnesses:
J. P. HALL,
M. M. LIVINGSTON.